United States Patent [19]
Küsters

[11] Patent Number: 6,149,563
[45] Date of Patent: Nov. 21, 2000

[54] CALENDER

[75] Inventor: Karl-Heinz Küsters, Krefeld, Germany

[73] Assignee: Eduard Kusters Maschinenfabrik GmbH & Co. KG, Krefeld, Germany

[21] Appl. No.: 09/242,277

[22] PCT Filed: Jul. 3, 1997

[86] PCT No.: PCT/DE97/01402

§ 371 Date: May 4, 1999

§ 102(e) Date: May 4, 1999

[87] PCT Pub. No.: WO98/06951

PCT Pub. Date: Feb. 19, 1998

[30] Foreign Application Priority Data

Aug. 14, 1996 [DE] Germany ............ 196 32 769

[51] Int. Cl.[7] ............................................ B29C 43/46
[52] U.S. Cl. ............................................ 492/7; 492/16
[58] Field of Search ............................ 492/7, 16, 20

[56] References Cited

U.S. PATENT DOCUMENTS

| | | | |
|---|---|---|---|
| 5,534,117 | 7/1996 | Roerig | 162/358.3 |
| 5,628,717 | 5/1997 | Van Haag | 492/7 |
| 5,919,121 | 7/1999 | Kusters et al. | 492/7 |
| 5,980,438 | 11/1999 | Van Haag et al. | 492/7 |

*Primary Examiner*—Irene Cuda
*Attorney, Agent, or Firm*—Kenyon & Kenyon

[57] ABSTRACT

A calender which includes a deflection-controlled roller with a rotating hollow cylinder and a non-rotating cross-head. Hydrostatic supporting elements on the cross-head can be radially displaced towards the inside circumference of the hollow cylinder, and have hydrostatic bearing pockets in their contact surfaces. The position of supporting elements are controlled using a cylinder space with a small cross-section. When there is a problem with the web, the cylinder spaces can all be hydraulically relieved, eliminating the contact pressure and therefore the exertion of force by the supporting elements.

2 Claims, 2 Drawing Sheets

CALENDER

BACKGROUND OF THE INVENTION

1. Field of the Invention

The present invention relates to a calender.

2. Description of the Prior Art

In the rollers described in the preamble, the bearing pockets rest against the inside circumference of the hollow cylinder with an edge which is sealed all around. The edge forms essentially sealed hydrostatic pressure chambers. The pressure of the chambers acts against the inside circumference of the hollow cylinder and produces the linear force in the roll nip. The pressure fluid is supplied via a first feed line and constantly flows to the outside over the edge of the bearing pockets, causing a bearing fluid film to form between the edge and the inside circumference of the hollow cylinder, preventing metal-to-metal contact. In order for the bearing pockets to be sealed and for pressure to build up in the pockets, the edge has to be pressed against the inside circumference of the hollow cylinder with a certain force. This is accomplished with the pressure in the sealed cylinder space. The sealed cylinder space is structured as a piston/cylinder unit in the supporting element, the force of which presses the supporting element and therefore the edge against the inside circumference of the hollow cylinder. The pressure fluid which acts on the cylinder space is supplied via a second feed line. The bearing pockets have pressure fluid at different pressures applied to them, individually or in various groups, in order to be able to adjust a linear force profile of the desired type along the roll nip. In practice the cylinder spaces are generally connected with a common feed line at a single pressure, which feed line is dimensioned so as to maintain sufficient contact.

A roller with two feed lines to the supporting elements is known from German Patent 38 20 974 A1. Such a roller has already been used in a calender, which thereby represents the state of the art. An important characteristic of the roller according to German Patent 38 20 974 C2 is that the bearing pockets are connected with the first feed line without a throttle, i.e. that the pressure fluid can pass over into the bearing pockets from the space under the supporting element, through the inner channels which are present in the supporting element, and have a cross-section which does not cause any significant pressure drop in normal operation.

The rollers of the prior art are also used in calenders with plastic-coated roller mantles. The plastic coatings are significantly more sensitive, mechanically and thermally, than a metal roller surface. If web problems occur, such a soft roller coating is therefore easily damaged. A web problem is, for example, a break in the web, which has the result that a roller with a plastic coating suddenly comes into contact with a hot counter-roller, something that the plastic cannot tolerate. In normal operation, the roller surface is protected from the hot counter-roller by the cooler web, for example the paper web. Doubling of the web can also damage the surface of the plastic coating, if the linear forces are high, by pressing the web into the coating.

In the case of such web problems, rapid opening of the roll nip due to the danger of damage to the roller coating is absolutely necessary.

During normal production of the calender, the cross-head of the roller is deflected away from the roll nip, due to the forces of the supporting elements which support the roller mantle. In the case of calanders with a large width, the amount of deflection is several centimeters in the center. The change in distance between the cross-head and the inside circumference of the roller mantle is overcome by moving the supporting elements out in a direction perpendicular to the cross-head. The volume of pressure fluid enclosed under the supporting element is increased by the amount which corresponds to this movement path.

This also holds true for calenders with deflection-controlled rollers with a so-called inside stroke. Here, to adjust the contact with a counter-roller, rather than moving the position of the cross-head of such a roller in its mounting on the roller stand, the hollow cylinder is moved perpendicular to its axis, by way of its so-called "inside stroke," to release the roll nip (as shown in German Patent AS 22 54 392). The supporting elements move in towards or out from the cross-head, so that the roller mantle can follow in these directions, parallel to itself. In rollers with inside stroke, the hollow cylinder is not mounted on the cross-head at its ends, but rather merely guided along the cross-head, in the plane of effect, perpendicular to its axis. The problem with that arrangement is that when the roller is in operating position, and when the supporting elements are moved out accordingly, large volumes of pressure fluid are enclosed under them exists.

The terms "at the bottom" and "at the top" as used herein are based on the orientation of a roll nip above the roller, as shown in FIG. 1.

If stress on the roll nip is supposed to be relieved quickly, these volumes of pressure fluid must be able to escape from the supporting element very quickly. This holds true both for mounted rollers, on which the cross-head is only deflected and only the axially inside supporting elements must be moved in again when the cross-head is retracted, and for rollers with inside stroke, on which the cross-head not only retracts but also moves crosswise relative to the hollow cylinder, as a whole.

The volumes which can escape are not very large and amount to approximately 942 cm$^3$ for 3 cm displacement of a single supporting element with a diameter of 200 mm, for example. This is true whether the displacement occurs as the result of deflection of the cross-head in the center, or as the result of crosswise movement with inside stroke. However, if stress on the roll nip is supposed to be relieved in at most 0.5 seconds, this corresponds to an instantaneous oil flow of 113,000 cm$^3$/min.

Each supporting element, i.e. each group of elements, has to be connected with the pressure supply and control system outside the roller via a separate line for the type of rollers in question. If each individual supporting element is controlled individually or in groups, and the stability of the cross-head is not allowed to be impaired by large inside channels, only relatively small pressure line cross-sections are possible within the cross-head, for reasons of space. Fast relief of the volumes of pressure fluid to be released cannot be accomplished with these pressure line cross-sections in the required amount of time and at the available pressures.

In the known calender stacks equipped with conventional rollers, where hard rollers alternate with soft rollers, usually so-called paper rollers, this problem has been known for a long time and has already been solved in different ways, for example in that the rollers are allowed to drop in their side mounts, to a stop, if web problems occur, in such a way that all of the roll nips of the calender are opened at the same time (as shown in DE-OS 20 10 322).

There are also already solutions for calenders with deflection-controlled rollers, although these have paid no attention to the problem of the line cross-sections (DE-AS 23 20 519).

In German Patent 28 48 021 B1, a roller of another type is shown, for which a quick-relief device has been included. However, this roller uses the "Nipco" principle, in which every supporting element is charged with fluid at only one pressure. The piston-like supporting element is seated to move back and forth in a cylinder bore of the cross-head, into which the pressure fluid is guided. A throttle bore is formed in the supporting element, which connects the cylinder chamber under the supporting element with the bearing pockets. The pressure fluid therefore first enters the cylinder chamber under the supporting element and presses the latter against the inside circumference of the hollow cylinder. The same pressure fluid gets into the bearing pockets through the throttle bore, and performs the function of hydrostatic support of the hollow cylinder by the supporting element. In German Patent 28 48 021 B1, a valve interrupts the feed of pressure fluid to all the supporting elements at the same time. This eliminates the contact pressure, but also the hydrostatic support and lubrication of each individual supporting element relative to the inside circumference of the hollow cylinder.

SUMMARY OF THE INVENTION

The object of the present invention is to create an effective quick-release device for calenders.

By eliminating the hydraulic pressure of the piston/cylinder unit which forms the cylinder space, which presses the supporting element against the inside circumference of the hollow cylinder and thereby guarantees the sealing function at the bearing pocket, the sealing function is eliminated. The volume of pressure fluid enclosed by the supporting element can suddenly escape into the annular space between the cross-head and the hollow cylinder. This fluid includes both the amount in the bearing pockets, but also to the amount under the supporting element, which must be displaced for the supporting element to move in. Displacement takes place not into the feed lines, but rather up through the bearing pockets, into the interstice between the cross-head and the hollow cylinder, and through the inside channels of the supporting element, which have an unthrottled cross-section.

All of the supporting elements are connected with a common pressure supply of the piston/cylinder unit which produces the contact pressure. Since the volumes of pressure fluid of the cylinder spaces are very small in comparison with the volumes of the pressure fluid working in the bearing pockets and under the supporting elements, they can flow out rapidly, given the existing line cross-sections, so that the sealing effect at the edge of the bearing pockets is cancelled out sufficiently for the amount of pressure fluid in the supporting elements, intended for the bearing pockets, which is much greater. That fluid can pass over into the annular space over the edge of the bearing pockets, practically instantaneously. This result is very fast, and, because all the cylinder spaces are generally supplied via a common feed line, also very uniform relief of the bearing pockets and therefore of the roll nip. After the valve is opened, the bearing pockets are essentially pressure-free, but they are not cut off from the pressure fluid supply. Rather, they remain filled with the pressure fluid intended for them, so that no metal-on-metal friction of the edges of the supporting elements on the inside circumference of the hollow cylinder can occur.

Automatic elimination of the pressure in the cylinder chambers can be accomplished.

BRIEF DESCRIPTION OF THE DRAWINGS

The drawings show an exemplary embodiment of the present invention.

DETAILED DESCRIPTION OF THE INVENTION

Figure 1:
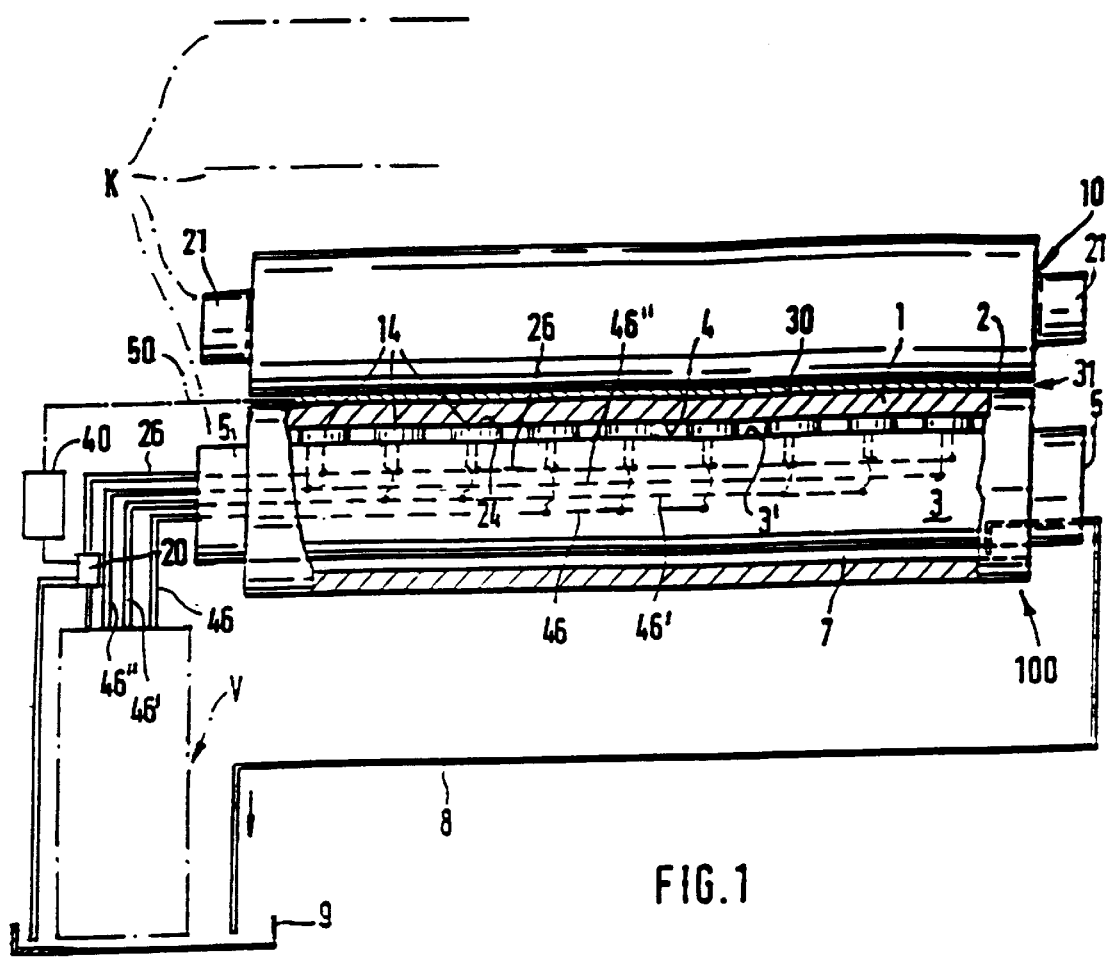
FIG. 1 shows a schematic side view of a pair of rollers, which form a calender or is part of a calender.

The calender of the present invention is designated as a whole as K. FIG. 1 shows only one pair of rollers, namely a top roller 10 and a bottom roller 100, between which a paper web 30 is exposed to pressure treatment in roll nip 31. The thickness of the web is shown with great exaggeration in FIG 1. Top roller 10 is a conventional solid roller. Bottom roller 100, on the other hand, has a rotating hollow cylinder 1, whose outside circumference 2 forms the working roller circumference, and through which a non-rotating cross-head 3 passes lengthwise. Cross-head 3 is spaced by a distance from the inside circumference 4 of hollow cylinder 1, all the way around, so that hollow cylinder 1 can move around cross-head 3 without cross-head 3 coming into contact with inside circumference 4. Hollow cylinder 1 can be supported, at the ends, on bearings on cross-head 3, not shown. In this device, displacement relates only to deflection of cross-head 3 inside hollow cylinder 1. However, hollow cylinder 1 can also move as a whole, relative to crosg-head 3, in an alternative embodiment, which is also called an embodiment with "inside stroke." In that embodiment, hollow cylinder 1 is not supported by the bearings on the cross-head, but rather only guided in the plane of effect. Displacement also includes displacement of the guidance, which is superimposed on deflection.

Journals 21 of top roller 10 as well as ends 5 of cross-head 3, which project out of hollow cylinder 1 at its ends, are mounted in a roller stand, not shown.

Figure 2:
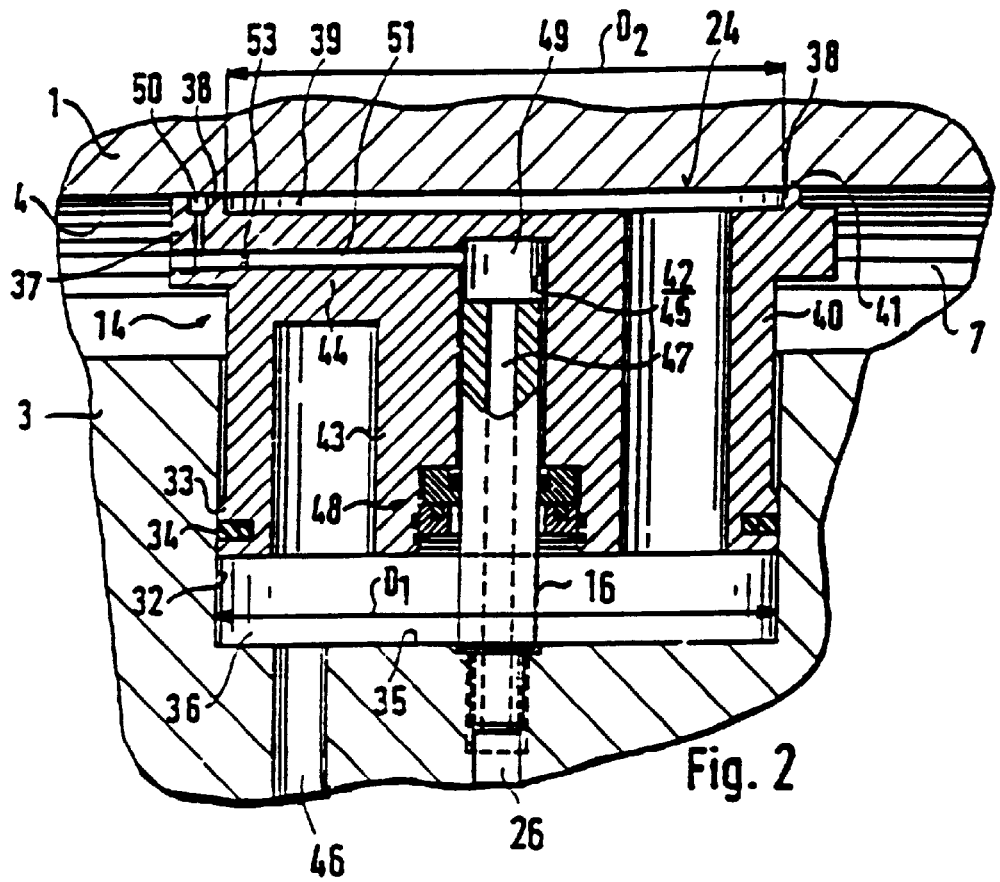
FIG. 2 shows a cross-section, through line V—V in FIG. 3, of an individual supporting element.
Figure 3:
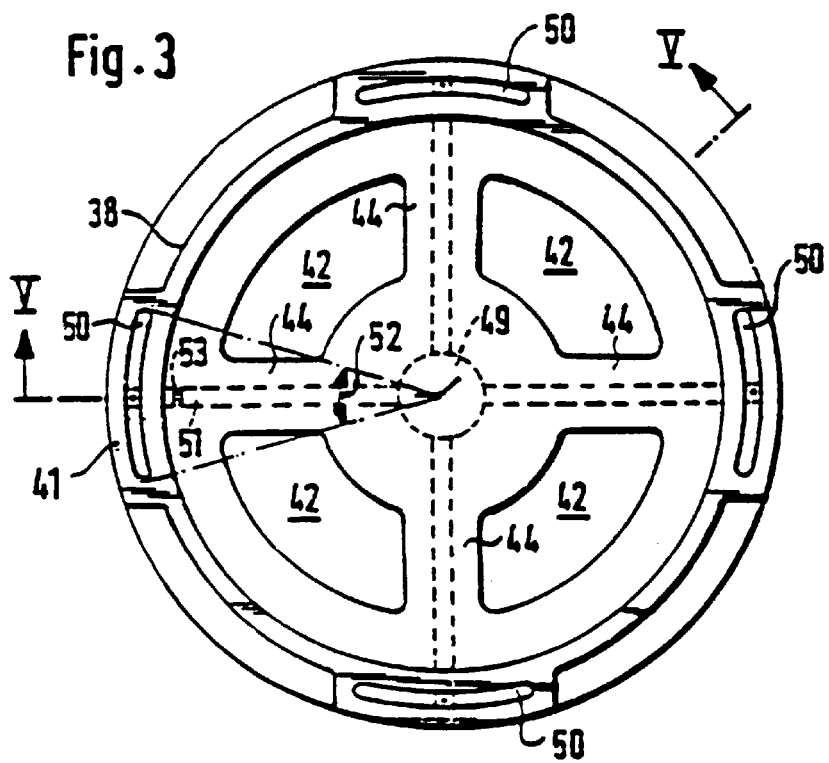
FIG. 3 shows a view of the supporting element according to FIG. 2.

On top 3' of cross-head 3, which is directed towards roll nip 31, several hydraulic supporting elements 14 are arranged. In the embodiment shown in FIG. 1, nine supporting elements 14 are distributed over the length of hollow cylinder 1. Supporting elements 14 rest against inside circumference 4 of hollow cylinder 1 with their contact surface 24, which is adapted in shape to outside circumference 4 of hollow cylinder 1. In FIGS. 2 and 3, a possible embodiment of supporting elements 14 is shown in detail.

A flat bearing pocket 39 (FIG. 2) is formed in contact surface 24, taking up a significant portion of contact surface 24, so that all that remains of contact surface 24 is ridges 38 around the edges, which go continuously around bearing pockets 39. In the exemplary embodiment, supporting element 14 is circular in cross-section in the contact region, but it can also be square or rectangular in cross-section.

As is evident from FIG. 2, supporting element 14 has a cylindrical piston-like housing 40, which sits in a cylindrical dead-end bore 32 of cross-head 3. Housing 40 has some degree of play in bore 32, and has an edge 33 at the bottom end, as shown in FIG. 2, which projects to the circumference of cylindrical dead-end bore 32, and is sealed there with a circumferential piston-ring-like gasket 34. Gasket 34 seals stroke movement of supporting element 14 in the axial direction of cylindrical dead-end bore 32. On the bottom of supporting element 14, a cylindrical chamber 36 is formed between the bottom of sealing element 14 and bottom 35 of cylindrical dead-end bore 32. This chamber can be filled with pressure fluid by a first feed line 46. At the top end, cylindrical housing 40 has a circumferential projection 37.

Supporting element 14 is not sealed in its cross-section which fills cylindrical dead-end bore 32, but rather is interrupted by channels 42, which have a large cross-sectional area and pass through from the bottom into pressure chamber 39. Housing 40 of supporting element 14 is formed as a hollow cylinder at the bottom, and contains a concentric cylindrical center part 43, which is held in place by four radial ridges 44, in the exemplary embodiment, which lead to the outer part of housing 40. Channels 42 are formed between ridges 44, as shown in FIG. 3. Due to the large cross-section of channels 42, the pressure of first feed line 46 is also applied to bearing pocket 39, and acts against inside circumference 4 of hollow cylinder 1 via of bearing pocket 39. This pressure is greater than the pressure in surrounding annular space 7, which can be entirely pressure-free.

A cylindrical bore 45 closed at the top is made in cylindrical center part 43, and a piston 16 with a small diameter extends into this bore 45. Piston 16 is tightly screwed into bottom 35 of cylinder chamber 36 and has a lengthwise bore 47 connected with a second feed line 26 in cross-head 3. Piston 16 is sealed relative to cylindrical bore 45 by a sealing arrangement 48 in the bottom region of center part 43. Above piston 16, a cylinder space 49 is formed, which is connected with edge chambers 50 formed in contact surface 41 of the edge, via radial channels 51 which pass through ridges 44. Edge chambers 50 are surrounded by edge 38 and open towards inside circumference 4 of hollow cylinder 1, and are arranged in the region of ridges 44, and take up a circumferential angle 52 of approximately 35° in the exemplary embodiment shown.

It is essential that channel 51 is formed to achieve a throttling effect, i.e. it has a small diameter over its entire length, or it includes a throttle point or diaphragm 53, as shown in FIG. 2. Due to the throttling effect, a bearing fluid film forms at the edges of edge chambers 50 which forms part of contact surface 41, which supports supporting element 14 relative to the pressure exerted in cylinder space 49 and directed against inside circumference 4 of hollow cylinder 1. The four edge chambers 50 which exist in the exemplary embodiment and are evenly distributed over the circumference, are separated from one another and are separately supplied with pressure fluid, in a throttled manner, a bearing fluid film with a pre-determined thickness exists at locations distributed over the circumference, and in this way, the entire supporting element 14 is supported, in stable manner, on a fluid film. Supporting element 14 is held at a pre-determined, very slight distance from inside circumference 4 of hollow cylinder 1, even in the regions between edge chambers 50 (which therefore do not have to extend over the entire circumference), so that metal-to-metal contact cannot occur at any point between edge 38 and inside circumference 4 of hollow cylinder 1. For complete stabilization of this type, at least three independent edge chambers 50 are required, but although four edge chambers 50 are shown in the exemplary embodiment, there can also be more.

The amounts of pressure fluid required for stabilization by the edge chambers 50 are small, so that cylinder space 49 can be considered "essentially sealed" in the present connection.

In the exemplary embodiment of FIGS. 2 and 3, diameter $D_2$ of bearing pocket 39, which has a circular circumference, is equal to diameter $D_1$ of cylinder chamber 36. In this case, supporting element 14 is completely free of the forces exerted against inside circumference 4 of hollow cylinder 1 in pressure chamber 39, and the contact pressure required for sealing is exclusively determined by the pressure in cylinder space 49.

It is also possible, however, to make diameter $D_2$ of bearing pocket 39 slightly, i.e. several percent, larger than diameter $D_1$. In this case, the pressure in bearing pocket 39 results in a certain amount of excess force, which tends to push supporting element 14 away from inside circumference 4 of hollow cylinder 1, but is overcome by the pressure in cylinder space 49.

In both cases, supporting element 14 is pressed against inside circumference 4 with a pre-determined force, and a corresponding seal of bearing pockets 39 and edge chambers 50 is formed.

Pressure fluid is applied to supporting elements 14 by way of supply unit V (FIG. 1). For all supporting elements 14, a common feed line 26 is provided for contact pressure and to supply edge chambers 50. The nine supporting elements 14 provided in the exemplary embodiment are divided into three groups: three in the center, two each to the right and left of the center, and one each at the ends. With regard to bearing pockets 39, these groups are supplied with pressure fluid separately and independent of each other, via feed lines 46, 46', and 46". In this way, it is possible to adjust a desired linear force profile in roll nip 31, so that is symmetrical towards the center.

When the linear force for surface treatment of paper web 30 is exerted in roll nip 31, essentially produced by the hydrostatic force of the pressure fluid present in bearing pockets 39 of supporting elements 14, cross-head 3 deflects away from roll nip 31, i.e. towards the bottom as shown in FIG. 1. The deflection is under the effect of these point stresses, which act on cross-head 3 in the crosswise direction. Hollow cylinder 1 remains essentially straight or adapts to a slightly deflected counter-roller 10. This results in changes in distance between the top of cross-head 3 and inside circumference 4 of hollow cylinder 1, which supporting elements 14 follow in that they move farther out of cylindrical dead-end bore 32.

Supporting elements 14 also move out quite far in normal operation for rollers with inside stroke. This displacement of the supporting elements 14 results from deflection superimposed on them.

If a web break or other web problem occurs, roll nip 31 has to be opened as quickly as possible, in order to prevent damage to a roller coating made of a sensitive material, particularly plastic.

In order to reduce the linear force in roll nip 31 and open roll nip 31 (a nip without the presence of web 30), cross-head 3 must be brought back into its non-deformed, straight state. This means that the distance between the top of cross-head 3 and inside circumference 4 of hollow cylinder 1 must be reduced again in the center of roller 100, which means that supporting elements 14 located in the center must be moved in rapidly. However, those supporting elements 14 contain a certain amount of pressure fluid in space 36, which cannot flow back through line 46 fast enough, even if the latter is opened up to supply 9, because the cross-section of line 46 is limited. The pressure in supporting element 14 would therefore only decrease gradually, i.e. cross-head 3 would remain in its deflected state for the time being and the linear force in roll nip 31 would still remain in effect to a significant extent at first, and would decrease too slowly.

As is evident from FIG. 1, a relief valve 20 is arranged in the feed line 26 to the essentially sealed cylinder space 49, which can connect line 26 with supply 9 in a rapid manner. Valve 20 is activated by a control device 40, which is connected with a sensor 50, which responds to the condition of paper web 30, and, for example, gives off a signal if paper web 30 is absent after a web break. This signal causes control device 40 to activate valve 20, which then connects line 26 with pressure-free supply 9. This causes cylinder spaces 49 to be suddenly relieved of pressure, all at the same time. The amount of pressure fluid to be displaced for this purpose is relatively slight, because the cross-section of cylinder spaces 49 is less than one-tenth of the cross-section of cylindrical dead-end bore 32, approximately one-sixteenth in the exemplary embodiment. If a supporting element 14 is moved even slightly away from the inside circumference of hollow cylinder 1, under the pressure in bearing pocket 39, and against the rapidly dropping pressure in cylinder space 49, the seal at edge 38 of bearing pocket 39 is eliminated, the pressure fluid contained in it can be shot out into annular space 7, and the pressure in bearing pocket 39 collapses, so that no force is exerted against inside circumference 4 of hollow cylinder 1 any longer. Cross-head 3 is not prevented from returning to its straight state, when it is not under stress.

What is claimed is:

1. A calender comprising:
   at least one deflection-controlled roller, the deflection-controlled roller including
      a rotating hollow cylinder which forms the circumference of the deflection-controlled roller,
      a non-rotating cross-head which passes through the rotating hollow cylinder lengthwise, an outside circumference of the cross-head being spaced a distance from an inside circumference of the hollow cylinder, and
      a plurality of hydrostatic supporting elements lined up along a length of the cross-head, the supporting elements being mounted in the cross-head for radial displacement, the supporting elements having bearing pockets on a contact surface which can be brought into contact with the inside circumference of the hollow cylinder, the supporting elements having an edge around a circumference of the contact surfaces which can be filled with pressure fluid, a cylinder space formed in every supporting element and connected to the edge, a pressure in one of the cylinder spaces acting to displace that supporting element towards the inside circumference of the hollow cylinder,
   the calender further including
      a first feed line to each supporting element connected to the bearing pocket in each supporting element,
      a second feed line connected to the cylinder space,
      a supply unit arranged outside the at least one deflection-controlled roller, the supply unit applying a pressure fluid to the first and second feed lines separately, and
      a quick-release device, the quick-release device opening a roll nip formed by the at least one deflection-controlled roller when there is a web problem, the quick-release device including a valve in the second feed line, the valve suddenly opening in response to a signal from a sensor which responds to the web problem, the valve connecting the cylinder space of each supporting element with a pressure-free supply.

2. The calender of claim 1, wherein the active cross-section of the cylinder space is at most 10% of the active cross-section of the bearing pockets.

* * * * *